United States Patent [19]

McClintock

[11] Patent Number: 4,584,217
[45] Date of Patent: Apr. 22, 1986

[54] COMPOSITE PRESSURE SENSITIVE ADHESIVE CONSTRUCTION

[75] Inventor: Jack M. McClintock, Stow, Ohio

[73] Assignee: Morgan Adhesives Company, Stow, Ohio

[21] Appl. No.: 465,288

[22] Filed: Feb. 9, 1983

Related U.S. Application Data

[63] Continuation-in-part of Ser. No. 303,058, Sep. 17, 1981, abandoned, and a continuation-in-part of Ser. No. 218,273, filed as PCT US80/00559, May 13, 1980, published as WO80/02532, Nov. 27, 1980, §102(e) date Dec. 19, 1980, Pat. No. 4,389,270, which is a continuation-in-part of Ser. No 38,679, May 14, 1979, Pat. No. 4,264,388, which is a continuation-in-part of Ser. No. 837,828, Sep. 29, 1977, Pat. No. 4,157,410.

[51] Int. Cl.$^4$ .................. F16L 59/14; B29D 23/00; B32B 5/18
[52] U.S. Cl. .................. 428/40; 156/218; 156/289; 428/41; 428/202
[58] Field of Search .......... 428/40, 352, 354, 201, 428/202, 41; 156/215, 218, 289

[56] References Cited

U.S. PATENT DOCUMENTS

| | | | |
|---|---|---|---|
| 2,191,704 | 2/1940 | Bennett | 428/40 |
| 2,292,024 | 8/1942 | Dreher | 428/41 |
| 2,294,347 | 8/1942 | Bauer et al. | 428/198 |
| 2,717,848 | 9/1955 | Jaye | 156/289 |
| 2,889,038 | 6/1959 | Kalleberg | 428/220 |
| 3,037,850 | 4/1963 | Cole | 156/289 |
| 3,157,204 | 11/1964 | Phillips | 138/137 |
| 3,257,228 | 6/1966 | Reed | 428/40 |
| 3,315,677 | 4/1967 | Tyrrell, Jr. | 428/40 |
| 3,332,829 | 7/1967 | Avery | 428/480 |
| 3,408,250 | 10/1968 | Finefrock | 428/40 |
| 3,411,978 | 11/1968 | Frobach et al. | 428/42 |
| 3,471,357 | 10/1969 | Bildusas | 428/336 |
| 3,518,158 | 6/1970 | Hurst | 161/208 |
| 3,556,894 | 1/1971 | Bernard | 156/235 |
| 3,632,386 | 1/1972 | Hurst | 117/46 |
| 3,664,910 | 5/1972 | Hollie | 428/192 |
| 3,723,223 | 3/1973 | Le Compte | 156/313 |
| 3,770,556 | 11/1973 | Evans et al. | 428/194 |
| 3,896,249 | 7/1975 | Keeling et al. | 428/202 |
| 3,985,602 | 10/1976 | Stuart | 428/29 |
| 3,995,087 | 11/1976 | Desanzo | 428/40 |
| 4,020,842 | 5/1977 | Richman et al. | 428/40 |
| 4,022,248 | 5/1977 | Hepner | 428/40 |
| 4,041,201 | 8/1977 | Würker | 428/40 |
| 4,101,032 | 7/1978 | Obidniak | 428/40 |
| 4,153,747 | 5/1979 | Young et al. | 428/40 |
| 4,157,410 | 6/1979 | McClintock | 423/40 |
| 4,158,587 | 6/1979 | Keller et al. | 156/216 |
| 4,243,453 | 1/1981 | McClintock | 156/152 |
| 4,264,388 | 4/1981 | McClintock | 428/40 |
| 4,285,999 | 8/1981 | Olivieri et al. | 428/41 |
| 4,348,440 | 9/1982 | Kriozere | 428/41 |
| 4,389,270 | 6/1983 | McClintock | 428/40 |

FOREIGN PATENT DOCUMENTS 52-71757 6/1977 Japan .

Primary Examiner—John E. Kittle
Attorney, Agent, or Firm—Oldham, Oldham & Weber

[57] ABSTRACT

A composite pressure sensitive adhesive construction has an adhesive portion located laterally on each side of a carrier. The central portion of the carrier is free from adhesive. A split release liner covers each adhesive portion. In use, the adhesive construction can be applied to any article, for example an insulation tube, and especially articles having a split or opening so that the article can be secured in a closed position. Moreover, the adhesive construction can have one laterally adhesive portion applied to the article, with the remaining adhesive portion having the release liner thereon which is readily removed and the remaining adhesive portion securely engaged to the article.

10 Claims, 18 Drawing Figures

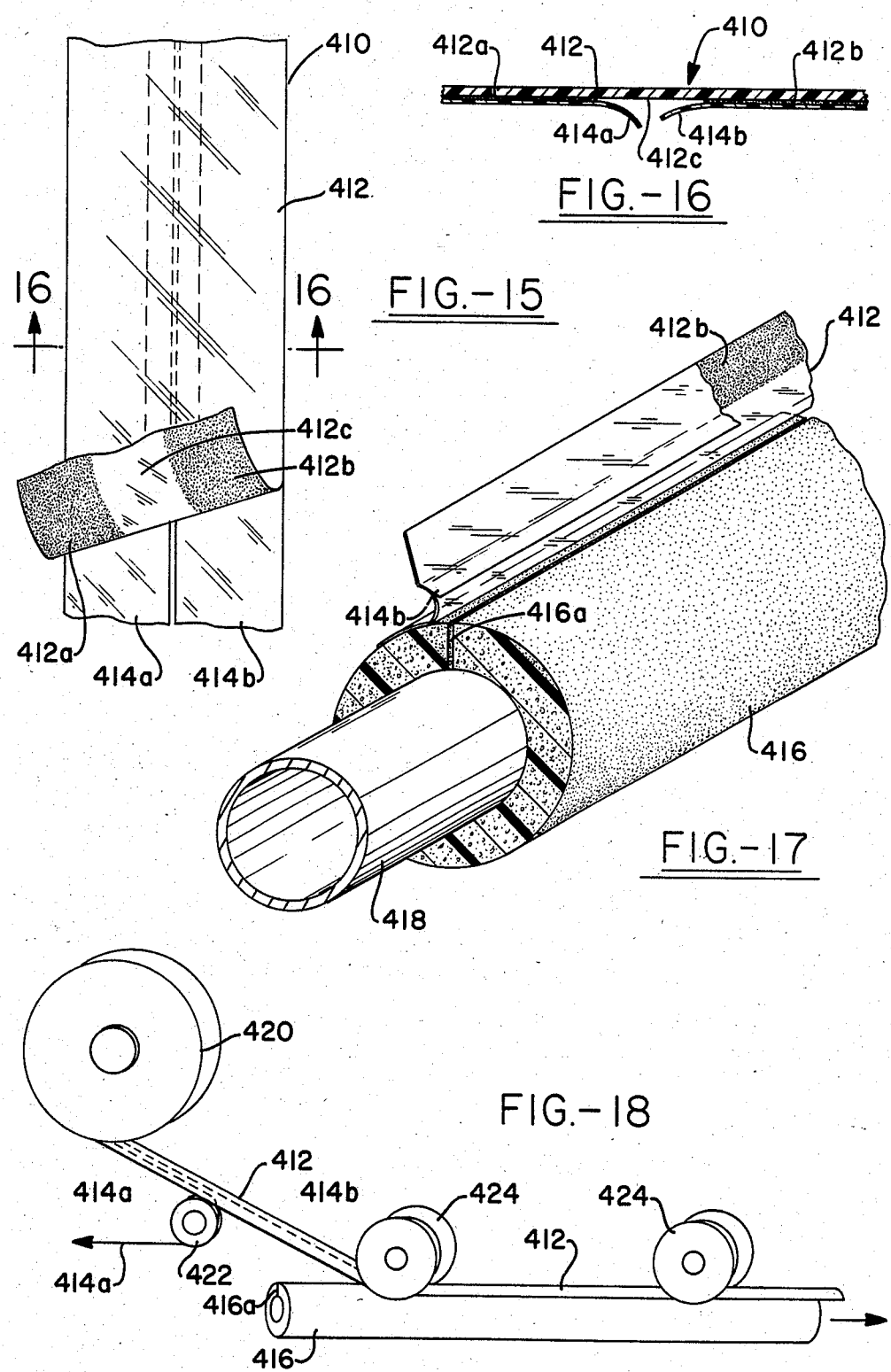

COMPOSITE PRESSURE SENSITIVE ADHESIVE CONSTRUCTION

CROSS-REFERENCE

This application is a continuation-in-part of U.S. Ser. No. 218,273, filed Dec. 19, 1980 now U.S. Pat. No. 4,389,270; which in turn is a U.S. national filing of US-PCT No. 80/00559, filed May 13, 1980; which in turn is a continuation-in-part of U.S. Ser. No. 038,679, filed May 14, 1979, now U.S. Pat. No. 4,264,388; which in turn is a continuation-in-part of U.S. Ser. No. 837,828, filed Sept. 29, 1977, now U.S. Pat. No. 4,157,410. This patent application is also a continuation-in-part of U.S. Ser. No. 303,058, filed Sept. 17, 1981, now abandoned.

TECHNICAL FIELD

The present invention relates to a composite pressure sensitive adhesive construction wherein a carrier film has adhesive portions located laterally thereon. A split release liner covers said adhesive portions.

BACKGROUND ART

One current method utilizing pressure sensitive adhesives involves a double-face coated tape, that is, a tape system having a carrier, adhesive layers applied to both sides of the carrier, and release liners applied to the adhesive layers. One of the release liners would normally be removed so that the tape could be attached to one edge of the jacket or to the item. Upon installation, the remaining release liner would be removed and the adhesive contacted with the other edge. However, this method generally resulted in poor adhesion in that the remaining edge usually acquired dust, dirt, grease, and the like, either during warehousing, shipment, or installation.

Another system utilized heretofore is commonly called the "two-tape" method. According to this system, each tape contained a carrier having an adhesive layer on each side thereof. To each adhesive layer was added a release liner. One of the adhesive faces on each tape was added to each edge of the material either at the factory or on the job. If added on the job, the same problems set forth above were encountered in that the edges would be dirty, greasy, or the like, thus a good bond of the tape generally was not obtained. Furthermore, an exact registration was difficult to obtain since the on-the-job application often involved working under difficult conditions. If one of the adhesive layers on each of the two tapes was applied to each edge during factory installation, a temporary bond of each edge to each other was not obtained, since, of course, the two remaining release layers would not adhere to each other. Thus, the item such as an insulated coolant or steam pipe jacket would freely open and was subject to abuse, damage, and the like, and further required the need to remove two liners.

Prior art cited by the United States Patent and Trademark Office in my previous applications include U.S. Pat. Nos. 3,257,228 to Reed; 3,332,829 to Avery; 3,411,978 to Frobach et al; 3,556,894 to Bernard; 3,664,910 to Hollie; 3,896,249 to Keeling et al; 3,995,087 to Desanzo; 4,020,842 to Richman et al; 4,022,248 to Hepner et al; and 4,041,201 to Wurker. However, none of these patents disclose a carrier having an adhesive located on lateral portions thereof in combination with a split release liner, or the utilization thereof in connection with adhering two articles together.

Other prior art patents include U.S. Pat. Nos. 2,191,704 to Bennett; 2,292,024 to Drener; 2,717,848 to Jeye; 2,889,038 to Kalleberg; and 3,087,850 to Cole. However, none of these patents relate to applicant's composite pressure sensitive adhesive construction.

U.S. Pat. Nos. 3,471,357 to Bileusas, 3,664,910 to Hollie, 3,896,249 to Keeling, and 3,985,602 to Stuart, while relating to various adhesive constructions and laminates, do not teach or suggest applicant's present invention.

U.S. Pat. Nos. 3,770,556 to Evans and 4,153,747 to Young also do not disclose applicant's structure or application to an article.

Japanese Pat. No. 52-71757 fails to disclose any split release liner or separation of lateral portions of an adhesive.

U.S. Pat. No. 2,294,347 to Bauer fails to disclose any split release liner as well as an adhesive free central area.

DISCLOSURE OF INVENTION

It is therefore an aspect of the present invention to provide a pressure sensitive adhesive construction having lateral adhesive portions on a carrier and a split release liner located thereon.

It is yet another aspect of the present invention to provide a pressure sensitive adhesive construction, as above, wherein a central portion of said carrier is free from adhesive.

It is yet another aspect of the present invention to provide a pressure sensitive adhesive construction, as above, wherein said release liner overlaps said adhesive portions.

It is yet another aspect of the present invention to provide a pressure sensitive adhesive construction, as above, wherein said construction is attached to one edge of an article for storage or until a final closure of the article and securement of the two article edges together is desired.

It is still a further aspect of the present invention to provide a pressure sensitive adhesive construction, as above, wherein said construction is easily secured to a tubular insulating member and forms a permanent disclosure thereof when desired after being placed in an operative application.

These and other objects of the present invention will become apparent from the following specification which describes in detail the embodiments without attempting to discuss all of the modifications in which the invention might be embodied.

Generally, an article having a longitudinal slit therein and an adhesive construction thereon, comprising: the article and the adhesive construction, said adhesive construction having a carrier layer, said carrier layer having two separate areas of an adhesive located at the lateral portions thereof, one of said lateral adhesive portions adhered to said article adjacent to said split, said second lateral adhesive portion located adjacent to said remaining split portion of said article, said adhesive carrier layer having a central portion free from said adhesive and a release liner, said release liner attached to said second lateral adhesive portion.

Generally, a process for attaching an adhesive construction to an article having a slit therein, comprising the steps of: (a) applying a laterally adhesive portion of the adhesive construction to an edge of said slit, said construction having a remaining lateral adhesive portion and a central area free from adhesive.

Additionally, an adhesive construction, comprising: a carrier, said carrier having lateral adhesive portions thereon, and a central area, said central area being free from adhesive; and a release liner, said release liner located on each said lateral adhesive portion.

BRIEF DESCRIPTION OF THE DRAWINGS

FIG. 15 is a top plan view of the composite pressure sensitive adhesive construction of the present invention containing lateral adhesive portions and showing a portion of the carrier being pulled back.

FIG. 16 is an enlarged cross-sectional end view taken on line 2—2 of FIG. 1.

FIG. 17 is a perspective view showing the adhesive construction being applied to an installation article.

FIG. 18 is a diagrammatical view showing the application of adhesive construction to an insulation tube.

BEST MODE FOR CARRYING OUT THE INVENTION

According to the concepts of the present invention, a composite pressure sensitive adhesive construction is provided temporarily joining one item to another until a permanent bond is desired. The pressure sensitive adhesive construction has a central release liner with a pressure sensitive adhesive layer releasably attached to each side thereof. An exterior release liner is releasably attached to usually one of the two exposed adhesive layers as when the construction is in the form of a roll, or usually to both of the adhesive layers as when the construction is in the form of a tape. Under clean and quality control conditions, two items may be fastened together through the use of the composite pressure sensitive adhesive constructions. That is, under such conditions, when a construction is utilized in the form of a roll, the first exposed adhesive layer may be applied to any item and then the single exterior release liner may be removed thereby exposing the second adhesive layer which is applied to another item. If the adhesive construction is in the form of a tape, the first exterior release liner is removed and applied to a surface of an item and similarly, the second exterior release liner may be removed with the exposed pressure sensitive adhesive then applied to a second edge or surface of an item. Thus, regardless of the construction utilized, the two edges or surfaces of the same or different items will then be temporarily connected to each other through the pressure sensitive adhesive construction. When a permanent bond is desired, the central release liner is removed, thereby exposing the two remaining sides of the adhesive layers which are then bonded together as through the application of pressure. In other embodiments, a carrier layer with an adhesive layer on one side thereof may be added to the original adhesive layer existing on each side of the central release layer. The application of such a construction to an item or article is similar as in the formation of a permanent bond. Such an embodiment provides bulk or a cushioned construction which is often desirable.

Figure 1:
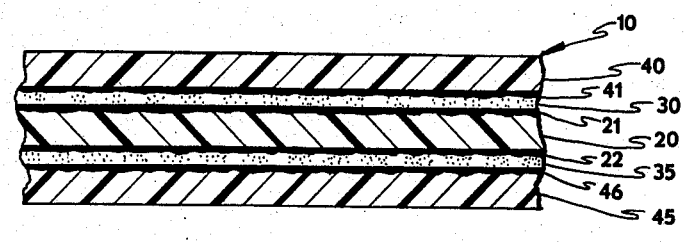
FIG. 1 is a cross-sectional view of one embodiment of a composite pressure sensitive adhesive construction according to the present invention.

FIG. 1 discloses a preferred embodiment of the invention wherein a composite pressure sensitive adhesive construction is shown, generally indicated by the numeral 10. The composite construction has a central release liner 20 which is coated on each side thereof as at 21 and 22 with a release coating. Generally, any conventional release coating may be utilized such as a silicone coating. Central release liner 20 may vary in thickness from about ½ mil to about 5 or 6 mils or higher with thicknesses in excess of this range generally being impracticable due to cost and flexibility. A desirable thickness, in most instances, is from about 1 to 4 mils and preferably 3 to 4 mils when utilized in connection with a pipe jacket. Various common materials and/or films may be utilized for central release liner 20 such as Super Calendered Kraft Paper, polyethylene-coated paper, polyethylene film, polyester films, polyvinyl films, polypropylene films, and the like. The thickness of release coatings 21 and 22 are very small and theoretically need only be a molecule thick so long as the liner is substantially covered. Hence, such release coatings are generally applied by Rotogravure printing, Mayer rod coating, or the like, and are barely measureable, that is, generally being well under 1/10 of a mil. Release coating layers 21 and 22 may be the same material to affect a tighter release on one side with an easier release on the other side, that is, a differential release. Such a differential release liner is preferred in the present invention so that upon opening of composite construction 10 at central release liner 20, the construction will open at the easier release liner such as, for example, liner 21 and the adjacent adhesive layer 30.

Two pressure sensitive adhesive layers reside upon central release liner 20, that is, one on each side. The first pressure sensitive layer is indicated by the number 30 and is generally the same as the second pressure sensitive layer indicated by the number 35, although they may be different in order to effect a better bond to a specific type of item. Pressure sensitive adhesive layers 30 and 35 generally vary in thickness ranging from about ½ mil to about 4 mils with a desirable thickness ranging from about 1 mil to about 2 mils. A preferred thickness is about 1 ½ mils. Of course, larger thicknesses can always be used but tend to be uneconomical. Common or conventional pressure sensitive type adhesives well known to those skilled in the art may be utilized such as an adhesive containing an acrylic base, or rubber base, which may be formulated with regard to specific purposes and/or uses and, hence, contains flame retardants, dyes, antioxidants, and the like. A specific example of a rubber-based pressure sensitive adhesive is a blend of styrene-butadiene rubber and polyisoprene, and at least a suitable conventional tackifier. Adhesive layers 30 and 35 may be applied to central release liner 20 in any common or conventional manner such as through calendering, coating, or the like.

In order to protect pressure sensitive adhesive layers 30 and 35 during storage, transportation, and the like, or between the time of manufacture and the application to an item or article, two exterior release liners are provided. The first exterior release liner indicated by the numeral 40 is applied to the remaining or exposed surface of first pressure sensitive adhesive layer 30 with a second exterior release liner, indicated by the number 45, being applied to the remaining or exposed side of the second pressure sensitive adhesive layer 35. Exterior release liners 40 and 45 may be constructed of the same material as the central release liner and additionally are of the same thickness as set forth above. Additionally, in order to prevent permanent adhesion or a good bond between the two exterior release liners and the adhesive layers, one side of the exterior liners is coated with a release coating. The release coating may generally be any conventional type of coating, for example, silicone as set forth above with regard to release coatings 21 and 22 and may be very small in thickness, as previously noted. Moreover, release coating 41 which is applied to the first exterior release liner 40 as well as release coating 46 which is applied to the second exterior release liner 45, may be applied in any conventional manner.

The composite pressure sensitive adhesive construction shown in FIG. 1 can be readily made in a manufacturing plant or facility under carefully controlled conditions at ambient temperatures so that good quality is achieved time after time. Moreover, the controlled conditions also ensure that no dust, dirt, or contaminants exist between the various adhesive layers and the adjacent layers of material. Additionally, exterior release liners 40 and 45 ensure good protection of the adhesive layers. Thus, the quality of the produced item is assured throughout storage, shelf, or warehouse life.

Due to the construction of composite pressure sensitive adhesive laminate 10, it is readily adaptable for application of various items or articles under less than desirable conditions. Generally, composite construction 10 may be utilized to effect joinder or a bond of any two items. The items may be different parts of the same article such as the edges or ends. Additionally, the joinder may be temporary until a permanent joinder is desired, as upon installation in the field or at the job site. Additionally, the embodiment of FIG. 1 can be wound into a roll for easy dispensing and may be held in the roll in any conventional manner, as upon a reel or the like. Similarly, the embodiment of FIG. 2 can also be wound into a roll for easy dispensing in any conventional manner.

Figure 3:
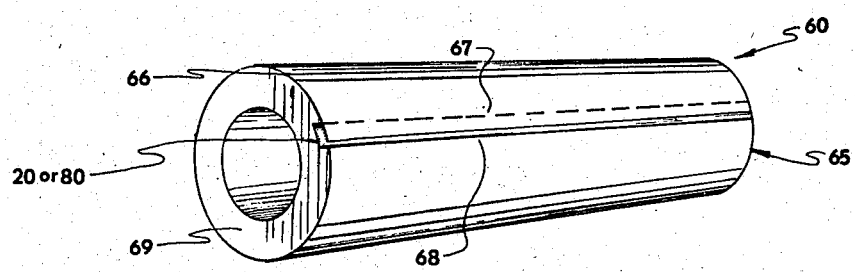
FIG. 3 is a plan view of a pipe insulation jacket having the composite pressure sensitive construction of the present invention joining two ends of the insulating jacket cover.
Figure 4:
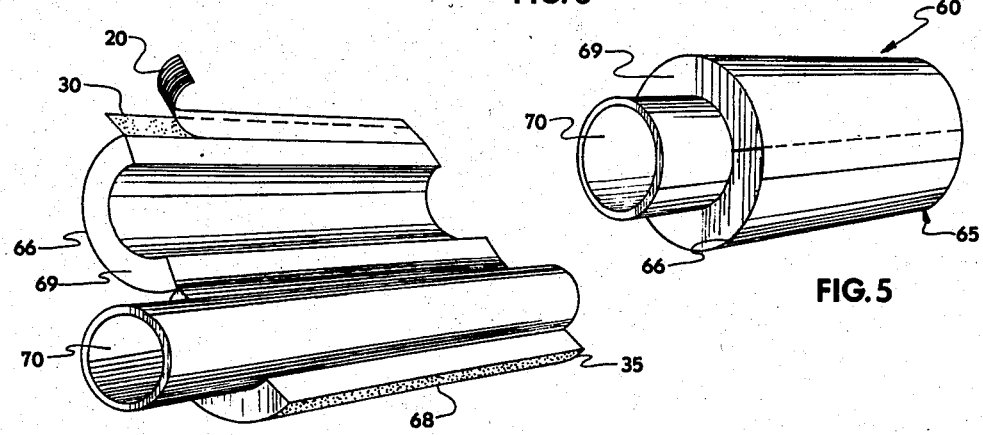
FIG. 4 is a plan view showing the insulation jacket in an open position with a pipe in one section thereof, an exposed pressure sensitive adhesive layer to one longitudinal end portion of the cover and the partial removal of a central release liner thereby exposing another pressure sensitive adhesive layer on the remaining longitudinal end portion of the cover.
Figure 5:
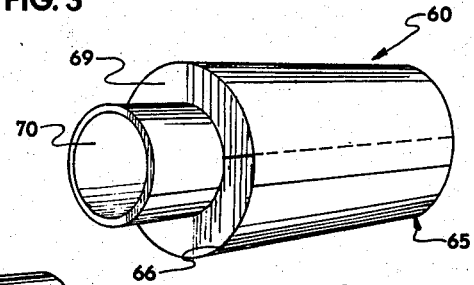
FIG. 5 is a plan view showing the insulation jacket in a closed position about a pipe wherein one longitudinal end portion of the cover has been bonded to the other longitudinal portion of the cover through the pressure sensitive adhesive layers.

FIGS. 3, 4, and 5, show a typical application of a composite pressure sensitive adhesive construction 10 to an article, generally indicated by the numeral 60. In the specific application shown in FIGS. 3 and 5, adhesive construction 10 has been applied to a specific article in the form of an insulating pipe jacket, generally indicated by the numeral 65. Such an application is generally conducted in a factory where the article 60, such as the pipe jacket 65, is manufactured. In such an environment, first exterior release liner 40 can be removed and first pressure sensitive adhesive layer 30 applied to an item such as the edge or end of the article, for example, the longitudinal end or side 68 of the article. Of course, care is taken during the operation to ensure that pressure sensitive adhesive layers 30 and 35 are applied to clean, dirt-free surfaces. In such a situation, a temporary bond is formed between the edges of the article herein, the pipe jacket ends, since central differential release liner 20 still releasably separates the first and second adhesive layers. In order to permit facile separation, central release liner 20 generally may extend outwardly beyond the longitudinal cover end of composite construction 10 such as one-half inch or an inch to permit grasping, as by hand. Additionally, it may also extend axially outwardly beyond the pipe jacket as shown in the left portion of FIG. 3, or beyond the other portion, i.e., the right portion of FIG. 3, or any combination thereof including all three portions.

Referring now to FIGS. 3, 4, and 5, a composite pressure sensitive adhesive construction as set forth in FIG. 1 has been applied to pipe insulating jacket 65 in the manner as set forth immediately above. Thus, in this particular application, cover 66 of insulating pipe jacket 65 has one longitudinal end or side 67 which is attached to the other longitudinal end or side 68 through the pressure sensitive adhesive construction. Cover 66 may be made of any conventional material such as Kraft paper, any plastic material such as polyvinylchloride, polyethylene, nylon, polyurethane, and the like. Additionally, depending upon the use of the particular material, cover 66 may also function as a vapor barrier, a liquid barrier, etc. Whenever insulating pipe jacket 65 is to be applied to a pipe 70, the insulating jacket is opened by grasping differential release liner 20 and applying a force thereto, thereby separating one of the adhesive layers from one side of said release liner. As shown in FIG. 4, insulation portion 69 of pipe jacket 65, which may be made out of any suitable insulating material such as polystyrene foam, polyurethane foam, fiberglass, and the like, is placed about pipe 70. Then, differential release liner 20 is completely removed, thereby exposing first pressure sensitive adhesive layer 30 applied to one end of the pipe jacket. Second pressure sensitive adhesive layer 35 is also exposed by the opening of the pipe jacket. Since, until this application, both pressure sensitive adhesive layers have been constantly covered, the two exposed layers are free of contaminants or other foreign matter. The pipe jacket is then closed with one end of the pipe jacket being pressed against the other end to ensure a good permanent and secure bond through adhesive layers 30 and 35.

Thus, a permanent bond is quickly and easily effected, is very simple in operation, requires reduced labor and, hence, reduces cost. Additionally, excellent contact is obtained since adhesive layers 30 and 35 are free from contaminants and furthermore due to the adhesive-adhesive contact, excellent shear is obtained.

Figure 2:
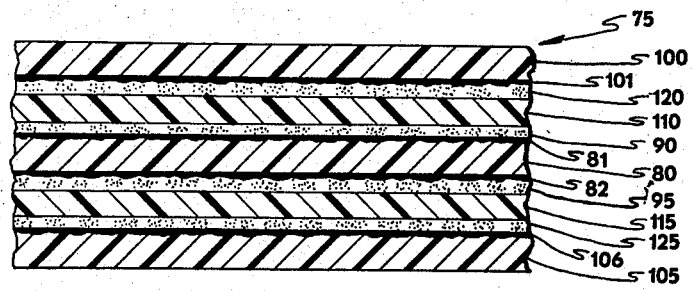
FIG. 2 is a cross-sectional view of another embodiment of a composite pressure sensitive adhesive construction according to the present invention.

In the embodiment shown in FIG. 2, additional layers have have been added to effect a cushioned composite construction which is generally indicated by the numeral 75. This construction is similar to that of FIG. 1, in that it contains a central release liner 80 having release coatings 81 and 82 thereon. Desirably, the release coatings have a different tightness so as to form a differential release liner. A second pressure sensitive adhesive layer 90 resides upon one side of release liner 80 with a third pressure sensitive adhesive coating 95 residing on the remaining side. Moreover, a first exterior release liner 100 having a release coating 101 thereon exists on one end of the construction with a second exterior release liner 105 having a release coating 106 thereon consisting of the other end of the construction. The specific types of material utilized for the various release liners, the release coatings, and the pressure sensitive adhesive layers are the same as set forth above with regard to the embodiment shown in FIG. 1 as are the various broad and desirable thicknesses.

To the second pressure sensitive adhesive layer 90 is added a first carrier layer 110 which may be made out of a matted, a non-woven, or a fiber material as well as a film. If a film is utilized, it generally may be the same type of material as used in the release liner. However, a soft or cushioned layer is generally preferred and such layers are preferably made out of fibers of polyester, matted polyester fibers, polyvinylchloride film, polyethylene film, a polyolefin film having from 2 to 8 carbon atoms in the repeating unit, and the like. The thickness of this carrier layer generally ranges from ½ mil to about 5 mils with a desirable range being from 2 mils to about 4 mils. Preferred thickness is about 3 mils. A second carrier layer 115 is applied to third adhesive layer 95 and may be made of the same material and may have the same thickness as does the first carrier layer 110.

To the first and second carrier layers 110 and 115 is added another pressure sensitive adhesive layer. Thus, a first pressure sensitive adhesive layer 120 is applied to carrier layer 110 with the first exterior release liner 100 being applied to the first adhesive layer. Similarly, a fourth adhesive layer 125 is applied to the second carrier layer 115 with the second exterior release liner 105 being applied to the fourth adhesive layer. Adhesive layers 120 and 125 once again can be made from the same adhesive materials as set forth with regard to FIG. 1 and also have the same thicknesses.

The application of a pressure sensitive adhesive construction 75 as set forth in FIG. 2 to an article or item is similar to that set forth in FIG. 1. Thus, the first and second exterior release liners (100 and 105, respectively) are removed with exposed adhesive layers 120 and 125 applied to any portion such as the edges or ends of an item or article. When a permanent bond is desired, a force is applied to differential central release liner 80 to remove the central release liner, then the adhesive laminate or construction is closed and a pressure is applied to the edges or ends of the article to effect a practical permanent bond between adhesive layers 90 and 95. Preferably, a portion of central release liner 80 extends beyond the other layers of the composite pressure sensitive adhesive construction 75 so that such portion may be readily grasped. In addition, this embodiment has the same advantages as the embodiment of FIG. 1 in that it is also produced under quality control conditions free from contaminants and the like. This embodiment, through additional adhesive layers 120 and 125 as well as the cushioned carriers 110 and 115, thus produces a cushioned adhesive bond. Such a cushioned construction is often desirable to overcome irregularities in the surface to which it is applied, for example, a textured surface.

Figure 6:
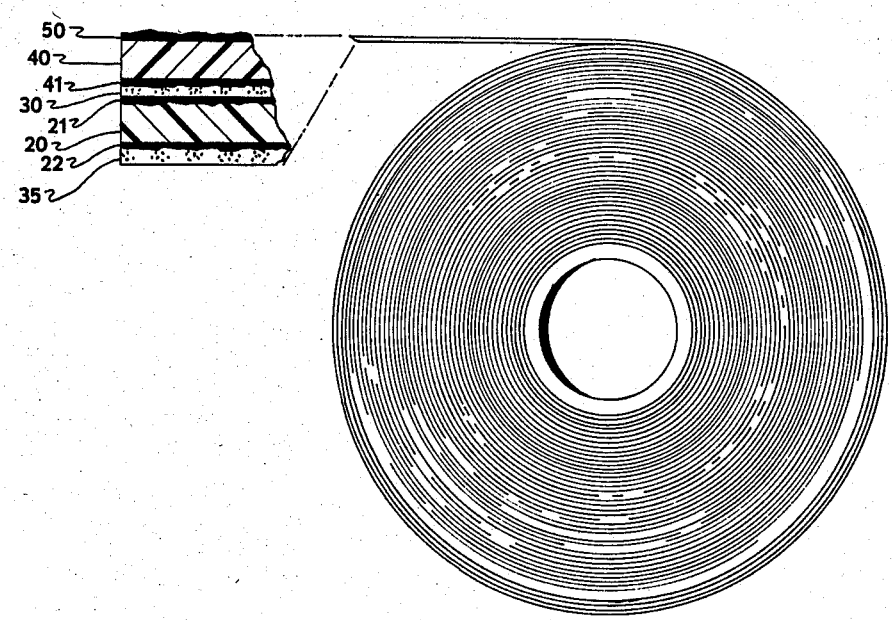
FIG. 6 is a side view showing a composite pressure sensitive adhesive construction similar to FIG. 1 in the form of a self-wound roll.

Referring now to FIG. 6 of the drawings, a self-wound composite pressure sensitive adhesive construction is shown. The self-wound tape roll is a very desirable product in that it can be readily produced, stored, shipped and then utilized by an end user in applying it to his product. As shown in the expanded side view portion of FIG. 6, the construction of the self-wound tape is identical to FIG. 1 except that one of the release liners such as bottom release liner 45 containing release coating 46 thereon, has been removed so that adhesive layer 35 will be attached to the uppermost surface of the tape layer upon which it resides. In order to prevent permanent or a very good adhesion between the adjacent layers of the tape construction, the top surface of the roll, that is, the top surface of release liner 40, contains a thin coating 50 of any conventional or common release agent such as silicone. Thus, the self-wound roll of tape as shown in FIG. 6 may be readily unwound and applied to any article in a manner similar to that of the construction of FIG. 1 except that, of course, one of the adhesive layers is already exposed and may be applied to an item without having to remove any exterior release liner. The types of various materials utilized for the various release liners, the release coatings, and the pressure sensitive adhesive layers are desirably the same as set forth above with regard to the embodiment shown in FIG. 1. Additionally, the various thicknesses are desirably the same as set forth with regard to the discussion of the embodiment of FIG. 1.

Figure 7:
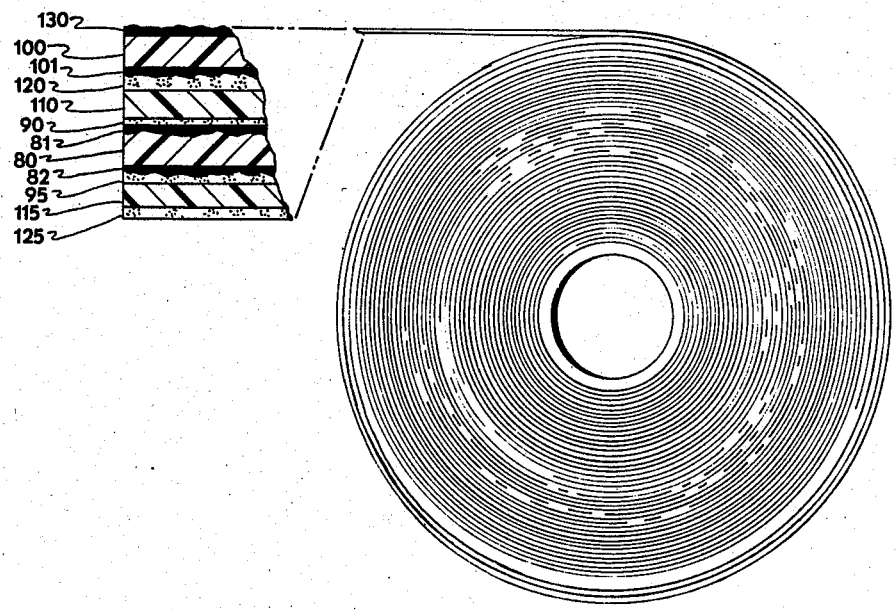
FIG. 7 is an enlarged fragmentary view showing a composite pressure sensitive adhesive construction similar to FIG. 2 in the form of a self-wound roll.

FIG. 7 of the drawings relates to a self-wound composite pressure sensitive adhesive construction wherein only an enlarged portion of the tape is shown. In this embodiment, the construction of the self-wound tape is identical to FIG. 2 except that one of the release liners, such as bottom release liner 105 containing release coating 106 thereon, has been removed so that adhesive layer 125 will be attached to the uppermost surface of the tape upon which it resides. Similarly, in order to prevent a permanent or a good adhesion between the adhesion layers of this tape construction, the top surface of the roll, that is, the top surface of release liner 100, contains a thin coating 130 of any conventional or common release agent such as silicone. As in FIG. 6, the construction of FIG. 7 may be unwound and applied to any article by applying exposed adhesive layer 125 to one item and by removing top exterior release liner 100 and applying the resulting exposed adhesive layer 120 to another item. When a permanent bond is desired, central release liner 80 is removed and adhesive layers 90 and 95 then are contacted with each other. The materials utilized for the various layers are desirably the same as those set forth with regard to the embodiment of FIG. 2 as are the various thicknesses of the individual layers.

Figure 8:
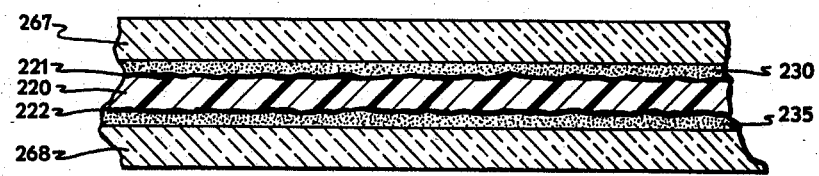
FIG. 8 is an enlarged fragmentary view showing a composite pressure sensitive adhesive construction as attached to the two ends of the jacket cover.
Figure 9:
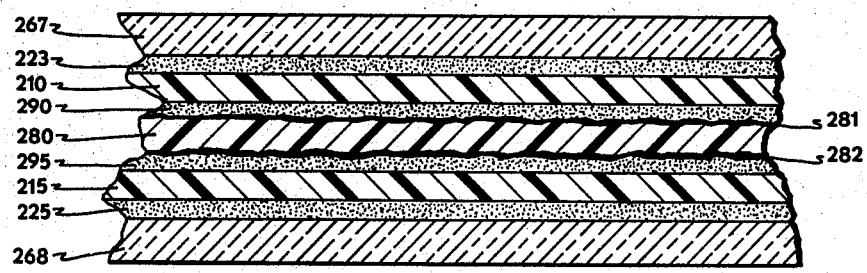
FIG. 9 is an enlarged fragmentary view showing another embodiment of a composite pressure sensitive adhesive construction as attached to the two ends of the jacket cover.

The constituents of the composite pressure sensitive adhesive construction and the method for applying the same may be varied according to the requirements of the particular industrial application, such as seen in FIGS. 8, 9, 10 and 11. In FIGS. 8 and 9, analogous to FIGS. 1 and 2 and the related discussion above, the constituents of the composite pressure sensitive adhesive construction have been reduced without departing from the scope of the invention. When permissible under industry standards for proper application of the adhesive directly to th longitudinal ends or sides of the insulating pipe jacket, the composit pressure sensitive adhesive construction may be reduced in the number of constituents therein. Referring to FIG. 8, pressure sensitive adhesive layer 230 is applied directly to the longitudinal end or side 267 to the jacket. Likewise, a pressure sensitive adhesive layer 235 is applied to the longitudinal end or side 268 of the other portion of the jacket. In order to effect a temporary seal during storage, the central release layer 220 is interposed between pressure sensitive adhesive layers 230 and 235. On both sides of central release layer 220 are release coatings 221 and 222 which permit the removal of central release layer 220 at the appropriate time from the adhesive layers 230 and 235.

At such time when the installation shall occur, the separation of the pipe jacket at release coating 221 or 222 facilitates the removal of central release layer 220 and the interaction of pressure sensitive adhesive layers 230 and 235 to form a permanent bond. Thus, the objects of the invention are accomplished utilizing a composite pressure sensitive adhesive construction which eliminates the need for external release liners by the application of the pressure sensitive material directly to the pipe jacket itself.

Alternatively, as shown in FIG. 9, the central release layer 280 having release coatings 281 and 282 separate pressure sensitive adhesive layers 290 and 295 from sealing permanently.

These adhesive layers 290 and 295 differ from the adhesive layers 223 and 225 firmly secured to longitudinal ends or sides 267 or 268, respectively, in that carrier layers 210 and 215 are interposed to provide a cushioned composite pressure sensitive adhesive construction similar to that described in FIG. 2 above. Once again, the difference of the securement of the pressure sensitive adhesive layers 223 and 225 directly to the pipe jacket accomplishes the objects of the invention without the necessity for any external release liners as provided in other embodiments.

Figure 10:
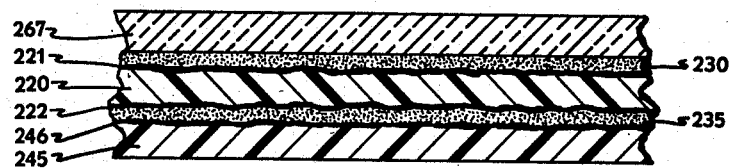
FIG. 10 is an enlarged fragmentary view showing a composite pressure sensitive adhesive construction as attached to one end of the jacket cover.
Figure 11:
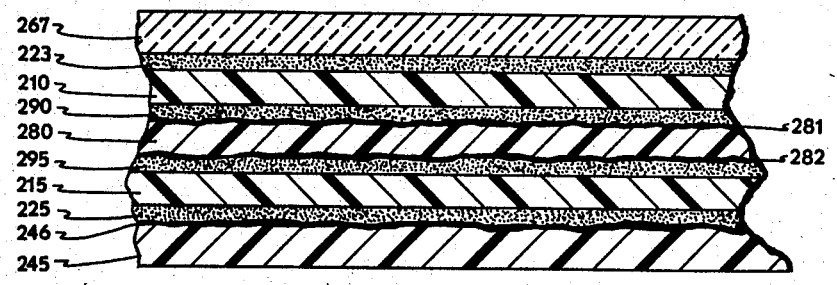
FIG. 11 is an enlarged fragmentary view showing another embodiment of a pressure sensitive adhesive construction as attached to one end of the jacket cover.

A variation of the embodiments expressed in FIGS. 8 and 9 are shown in FIGS. 10 and 11. In these cases, rather than secure pressure sensitive adhesive layers 230 and 235 directly to both longitudinal ends or sides 267 or 268, respectively, one external release liner 245 having release coating 246 is provided on one side of adhesive layer 235 and adhesive layer 230 is secured to longitudinal end or side 267. Therefore, rather than have both adhesive layers 230 and 235 attached to the longitudinal sides 267 and 268 of the jacket, one end is detached therefrom in order that the storage of the jackets need not be done in a cylindrical form. FIG. 10 differs from FIG. 11, in that a single release layer 220 having release coatings 221 and 222 is interposed between adhesive layers 230 and 235 in the former. In the latter, central release layers 280 having release coatings 281 and 282 have pressure sensitive adhesive layers 290 and 295, carrier layers 210 and 215, and pressure sensitive adhesive layers 223 and 225. The additional layers 210, 215, 290 and 295 provide the additional cushioned composite effect which has been analogously described above with reference to the embodiments in FIG. 9 and FIG. 2.

In FIGS. 8 and 9, the pressure sensitive adhesive layers 230 and 235 or 223 and 225 may be applied to the surface of the jacket pipe 267 or 268 according to any method which will adequately secure and adhere the adhesive to the jacket surface. Because adhesive layers 223 and 225 are permanently placed between carrier layers 210 and 215 and jacket surfaces 267 and 268, the adhesive composition need not be pressure sensitive, but may also be any conventional adhesive which permanently secures two materials such as the various structural adhesives which include epoxy, polyurethane, neoprene, nitrile, and silicone-type adhesives. Typically, the application of the adhesive layers to the pipe jacket surfaces may be accomplished by the operations of painting, spraying, rolling, or the like, followed by a drying operation. The application of this operation may occur at any point of manufacture prior to storage and the requirements for the interposition of the central release layer 220 or 280 follow the needs of that for other embodiments discussed above. Because of the composite pressure sensitive adhesive construction is formed in situ between the surfaces of the jacket, the need for a roll as shown in FIGS. 6 and 7 is obviated for the entire composite adhesive construction. However, with reference to the embodiment shown in FIG. 9, alternative forms of construction are available. In the first alternative, the adhesive layer 223 may be applied to the surface 267 of the jacket followed by the application of carrier layer 210, followed by the application of pressure sensitive adhesive layer 290, with the analogous operations occurring for layers 225, 215 and 295. Then, the central release layer 280 having release coatings 281 and 282 may be applied in an identical manner as that described above with reference to FIG. 8.

The second method employs the application of pressure sensitive adhesive layers 223 and 225 to surfaces 267 and 268 of the jacket, followed by application of a sandwich comprising the constituents of carrier layer 210, pressure sensitive adhesive layer 290, central release layer 280 having release coatings 281 and 282, pressure sensitive adhesive layer 295, and carrier layer 215. This intermediate composite construction, once placed between adhesive layers 223 and 225 completes the installation via an alternative method.

With reference to FIGS. 10 and 11, the pressure sensitive adhesive layers 230 and 235 or 223 and 225 may be applied to the surface of the pipe jacket 267 or 268 as has been demonstrated with the embodiments illustrated in FIGS. 8 and 9. Because the adhesive layer 223 is permanently placed between carrier layer 210 and jacket surface 267 with no further need of separation, any adhesive material commonly used in the art may be employed for securing the carrier layers to the jacket pipe surfaces. Because the adhesive layers may be applied by painting, spraying, rolling, or the like, followed by a drying operation, sufficient time must be allocated for these individual operations prior to the time of storage of the pipe jackets for later use. Because the pressure sensitive adhesive layer compositions in FIGS. 10 and 11 do not require ends 267 and 268 to be joined together during storage, alternative methods of storage may be employed than that found with the cylindrical storage requirements of the other embodiments. Nevertheless, because the construction is formed in situ between the surfaces of the jacket, the need for the rolls as shown in FIGS. 6 and 7 is eliminated.

In place of applying adhesive layers 235 and 225 to a longitudinal end or side 268 of the pipe jacket, the external release liner 245 is provided to protect the adhesive layers 235 and 225 from debris and the other physical objects which would harm the pressure sensitive qualities of the layer. The external release liner 245 with release coating 246 on the contact side thereof is analogous to external release liner 45 as shown in FIG. 1 and releasably attaches to pressure sensitive adhesive layers 235 and 225. With reference to FIG. 11, two alternative methods of construction are available, similar to that found in the embodiments shown in FIG. 9. In the first alternative, layers 223, 210 and 290, liner 280, layers 295, 215, 225, and liner 245 may be applied and secured sequentially in a series of individual processes. The second method employs the application of adhesive layer 223, followed by the securement of an intermediate composite of layers 210 and 290, release liner 280, and layers 295 and 215, followed by application of layer 225 and liner 245. Either process, considering the comparative efficiency of the particular manufacture, may be employed to achieve the same composite pressure sensitive adhesive construction.

After storage, the constructions shown in FIGS. 10 and 11 are taken to the job site and the external release liner 245 is removed such that pressure sensitive adhesive layers 235 and 225 may contact the surface 268 of the pipe jacket. Then, the central release liners 220 and 280 may be removed and adhesive layers 230 and 235 or 290 and 295 may form a bond completing the installation of the pipe jacket around the pipe.

Figure 12:
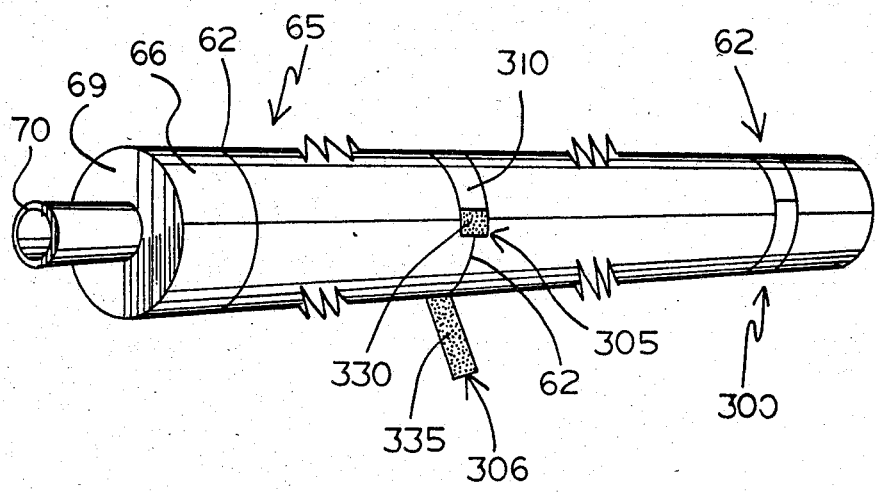
FIG. 12 is a plan view of several sections of the pipe insulation jacket about a pipe in various stages of butt interconnection by employment of the butt sealant strip pressure sensitive adhesive construction.

At the site of installation of pipe jackets 65 on pipe 70, the various sections 65 may be sealed at the butt intersections 62 thereof. Referring to FIG. 12, this butt sealing is accomplished by latitudinal wrap of butt sealant strip 300 at each intersection 62. Without adequate interconnection of adjoining jackets 65, the insulative properties of insulation portion 69 and the liquid barrier and vapor barrier functions of cover 66 are weakened at or adjacent to intersections 62.

Figure 13:
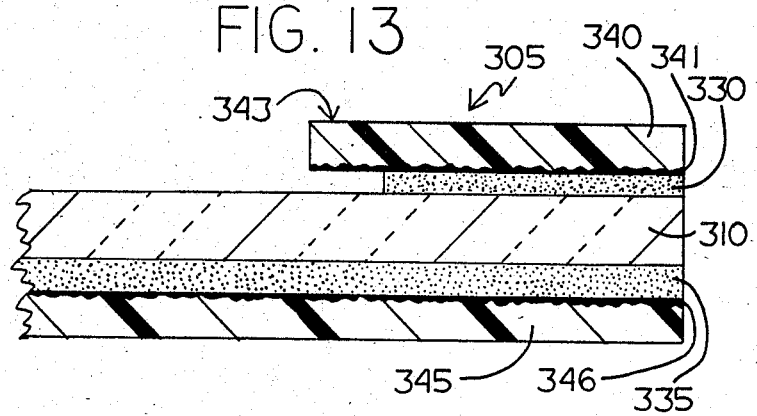
FIG. 13 is an enlarged fragmentary view showing one embodiment of the butt sealant strip pressure sensitive construction.

Butt sealant strip 300 adequately interconnects the intersections 62 of jackets 65. Referring to FIG. 13, it is seen that strip 300 comprises a sealant layer 310 made from the same materials as cover 66 described above, two pressure sensitive adhesive layers 330 and 335 on opposite sides of sealant layer 310, and two exterior release liners 340 and 345 releasably attached to respective adhesive layers 330 and 335 through the employment of release coatings 341 and 346 therein between. The type and dimension of the adhesive layers 330 and 335 are adequately described by reference to the description of layers 30 and 35 above. Likewise, the materials used for liners 340 and 345 and release coatings 341 and 346 are adequately described by reference to the description of layers 40 and 45 and coatings 41 and 46 above. Since the liners, release coatings, and sealant layers 310 are in the form of a strip, they have two termini.

Referring again to FIG. 13, it is seen that, while adhesive layer 335 and release liner 345 with coating 346 extends over the entire lower side of layer 310, adhesive layer 330 and release liner 340 with coating 341 extend over only a fractional portion of strip 300 adjacent to its terminus 305. The adhesive layer 330 is placed on strip 310 only to the extent necessary to provide adequate surface contact area for cohesion with adhesive layer 335 at the opposite terminus 306 of the same strip 300.

As seen in FIG. 12, three intersections 62 are illustrated in various stages of processing: two sections of pipe jacket 65 are shown without sealant strip 300, followed by a partial installation of strip 300 over intersection 62, followed by a completed installation of strip 300 over intersection 62. Strip 300 is placed upon intersection 62 after the removal of external release liner 345, which may be performed simultaneously by peeling and attaching steps to minimize foreign materials from disrupting the adhesive qualities of layer 335. As terminus 306 approaches the point of first beginning, release liner 340 may be removed, in order that adhesive layer 335 secures to adhesive layer 310. As seen in FIG. 12, the completed wrap seals intersection 62 of two sections of pipe jacket 65.

Adhesive layer 330 is provided on layer 310 to improve the bonding qualities of strip 300, to increase the shear strength thereof, to eliminate the use of other adhesives which require heating to complete the sealing requirements. The sealant strip 300 may be of any length greater than the circumference of pipe jacket 65, and the surface area of adhesive layer 330 may be adjusted accordingly. The pressure sensitive adhesive employed has superior cohesive qualities which promotes a stronger bond than if adhesive layer 335 was secured to the upper side of sealant layer 310. The width of strip 300 may vary according to the strength of interconnection and sealing, but generally a width of 2 to 4 inches is adequate on pipe jackets 65.

Figure 14:
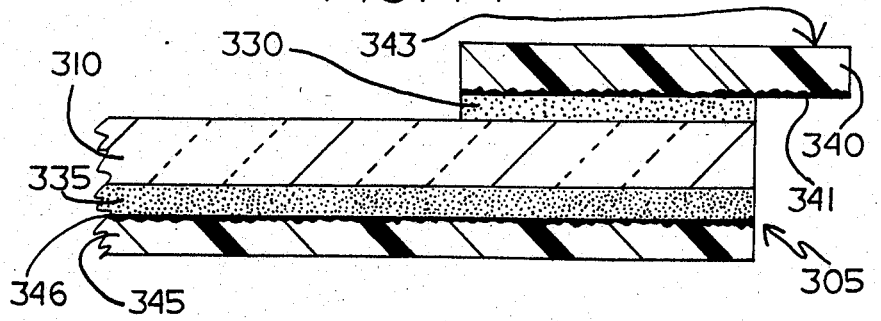
FIG. 14 is an enlarged fragmentary view showing alternative embodiment of the butt sealant strip pressure sensitive adhesive construction.

For ease of removal, the release liner 340 may have a tab overlap porton 343 either extending inwardly along strip 300, as seen in FIG. 13, or outwardly beyond terminus 305 of strip 300, as seen in FIG. 14. Either location facilitates removal of liner 340 with one hand while the other hand is maintaining proper application of strip 300 near terminus 306.

The uses of the composite pressure sensitive adhesive constructions are, of course, numerous. Specific examples include carton sealing, gasket applications, molding (e.g. wood, metal, plastic) applications, temporary template followed by a later permanent bond for a vapor or moisture seal, and any of a myraid of applications wherein a temporary bond may be initially desired followed by a permanent bond such as a process of a temporary assembly of pieces, followed by storage, transportation, etc., and then arrangement into a permanent assembly.

According to another concept, the present invention relates to the composite pressure sensitive adhesive construction having adhesive portions located on the lateral end portions of a carrier, and the application thereof to an article, as for example, an insulation wrapper for a pipe, see FIGS. 15 through 17.

Reference now is particularly directed to the details of the construction shown in the drawings, wherein said composite pressure sensitive adhesive construction or laminate is generally shown by the numeral 410. Carrier film or web 412 has two laterally spaced portions as in the form of layers or strips of a suitable adhesive, preferably a pressure sensitive adhesive 412a and 412b provided thereon, and is separated by non-adhesive center portion as in the form of strip 412c. By lateral it is meant towards either edge of carrier 412, although the adhesive portions need not be on or contacting the lateral edges although such is preferred. Carrier 412 is made of conventional materials such as Super Calendered Kraft Paper, polyethylene-coated paper, polyester films, polyethylene films, polyvinylchloride films, polypropylene films, and the like. The thickness of carrier film 412 is generally between 0.5 and 8 mil with from about 1 to about 4 mils being preferred. The pressure sensitive adhesive is also of a conventional type and may be an acrylic base or a rubber base such as a blend of styrene-butadiene rubber and polyisoprene containing a suitable tackifier therein. The adhesive may contain various dyes, antioxidants, and the like. The thickness of adhesive layers 412a and 412b generally ranges from about 0.5 to about 4 mils and preferably from about 1.0 to about 2.0 mils. The amount of free adhesive area is generally from about 10 to about 50 percent of the total carrier width and preferably from about 15 to about 35 percent.

A release strip or liner 414 is removably attached to the adhesive layer thereon such as a silicone. This backing liner 414 has a longitudinally extending cut or slit therein to provide two release strips 414a and 414b that are affixed to the pressure sensitive adhesive layers 412a and 412b respectively as shown in the drawings. As shown in FIG. 15, the release strips 414a and 414b extend or overlap beyond the pressure sensitive adhesive portions and into the central adhesive free portion 412c of the carrier. Release liners 414a and 414b can be made out of the same material as carrier layer 412 such as various types of paper or plastic film. The thickness can also be the same as the carrier layer.

FIG. 16 of the drawings clearly shows how the overlapping adjacent center portions of the backing strips are not adhesively adhered to the carrier film 412 because adhesive material 412a and 412b does not extend into the center area 412c of the carrier film.

Adhesive construction or laminate 410 can be utilized to join or secure two articles or ends thereof together. Generally, any items can be secured together, as above, as for example tubes, cylinders, or other items generally having a straight edge or opening. A specific example is the pipe insulating tube after it has been applied to a pipe. Adhesive construction 410 generally is applied to one edge of the article as by removing one of the release liners 414a or 414b. The article can then be stored, or the like, until needed. Once applied to its final use, the remaining release liner is removed and the exposed lateral adhesive portion then applied to the remaining item, or article end. The application of the adhesive construction will be explained more fully with regard to a pipe insulation tube.

FIG. 17 shows how the adhesive construction 410, after it is secured to a tube 416 formed of a suitable foam plastic material, can be attached to a pipe 418 for insulation action. Foam tube 416 has a longitudinally extending slit or slot 416a therein, and the adhesive layer 412a and 412b is attached to insulation tube 416 with the center portion 412c of the carrier film 412 having no adhesive layer thereon overlying the slit provided in the insulation tube.

The formation of the insulation tube product adapted for affixation to the pipe 418 is best shown in FIG. 18. Laminate 410 can be positioned on a tape supply or storage roll 420 and is pulled from the roll 420 in a suitable manner but with one release liner 414a being pulled back over the support reel 422 and being removed from the laminate 410 which then has adhesive layer 412a exposed. The remainder of the strip is lead around a pressure roll 424 so as to apply the adhesive strip 412a to the foam tube 416 immediately adjacent but slightly spaced from slit 416a therein. Next, the unit formed of the insulation tube 416 and the remainder of the laminate 410 can move along further in the apparatus and a second pressure roll 424, if desired, can be used to guide the product longitudinally in the apparatus or to assist in pressure application of the web to secure the laminate 410 in good permanent relationship to the tube 416. If desired, a mandrel can be provided within the bore of the tube 416 as it is being processed as shown in FIG. 18 to facilitate alignment.

From the foregoing, it should be readily seen that after the adhesive insulation tube provided has been snapped around or otherwise engaged with the pipe 418, then the remaining adhesive portion of the laminate 410 can be secured to the tube 416. This is accomplished by removing release strip 414b to expose the adhesive layer 412b and then applying said adhesive strip 412b against the remaining periphery edge of foam insulation tube 416. Due to the exposed lip of strip 414b, it can be readily removed in the field as by being peeled off with a hand or even a glove. A good adhesive bond is thus obtained between the laminate 410 and the adhesive strips thereon with the foam material comprising the tube 416. It will be seen that the center area 412c of this carrier film has no adhesive thereon but it overlies the slit portion of the tube and permits laminate 410 to be easily maneuvered when applying so as to be readily engageable with the periphery of the insulation tube 416 on opposite sides of the slit 416a. It is noted that the inner diameter of the tube 416 is made substantially equal to the outer diameter of the pipe 418.

The insulation tube 416 is made from any conventional material such as foamed polyurethane, and the like.

Thus, relatively inexpensive materials have been used in making up the securing means for the foam insulation tube 416 and the adhesive means and strips provided will retain such foamed insulation tube in good operative engagement with the pipe 418 for a long time under normal operative conditions.

It should be noted that the free edge of the carrier film 412 that has the adhesive strip 412b thereon, forms a pull tab that enables one to pull or tension the tube 416 as it is secured around the pipe 418. Such tube 416 is generally made from rubber or plastic so as to be flexible and at least slightly resilient. Hence, one can tension the film 412 to close the slit 416a and pull off the backing strip 414b to secure the adhesive strip or layer 412b to the tube 416.

Moreover, the circumferentially or central inner unsecured edge of release strip 414b is readily exposed by bending the unsecured edge of the laminate 10 outward or backward as indicated in FIG. 17. The exposed unsecured inner edge of backing strip 414b can readily be grasped even with a glove and thus release liner 414b is readily removed. Adhesive layer 412b is then bonded to the surface of tube 416 to complete the attachment of laminate 410 to tube 416 and such tube to pipe 418, as noted above.

In some instances, the slit or split in the tube 416 would not extend completely through the tube but would only extend partially therethrough and be completed by a tearing action as on the tube 416 was pulled around the pipe 418.

Such slitting of tube 416 preferably is done by a cutter disc or member suitably and operably associated with the apparatus of FIG. 18 and/or with a mandrel (not shown) over which tube 416 is being drawn as it is moved along past rolls 424. Of course, other guides or rolls like rolls 424 can be provided to control and position tube 416 as the adhesive laminate is being applied and as the tube is slit.

Such tube 416 is sufficiently resilient that it can be pulled over tee's and elbows to fully insulate a pipe, and the tube 416 will enclose pipe 418 over 360° of its circumference.

While one complete embodiment of the invention has been disclosed herein, it will be appreciated that modification of this particular embodiment of the invention may be resorted to without departing from the scope of the invention.

What is claimed is:

1. An article having a longitudinal split therein and an adhesive construction thereon, comprising:
   the article and the adhesive construction,
   said adhesive construction having a single carrier layer, said carrier layer having two separate areas of an adhesive located on one side thereof at the lateral portions thereof and a central portion free from said adhesive located between said lateral portions,
   one of said lateral adhesive portions of said carrier layer adhered to said article adjacent to said split, said second lateral adhesive portion of said same carrier layer non-adheringly located adjacent to said remaining split portion of said article, and said adhesive-free portion overlying said split portion,
   said adhesive carrier layer having a single release liner, said release line attached to said second lateral adhesive portion, said release liner extending into said adhesive-free area and forming a tab.

2. An article according to claim 1, wherein said adhesive is a pressure sensitive adhesive.

3. An article according to claim 2, wherein said lateral adhesive portions extend to the lateral edges of said carrier.

4. An article according to claim 3, wherein said article is insulation for a pipe.

5. An article according to claim 4, wherein said pipe insulation is located about said pipe, and wherein said release liner is removed and said second lateral adhesive portion adhered to the remaining portion of said pipe insulation.

6. A process for attaching an adhesive construction to an article having a slit therein, comprising the steps of:
   removing a release linear from a lateral portion of an adhesive construction having a single carrier layer, said carrier layer having two separate areas of an adhesive located on one side thereof at the lateral portions thereof so that a central adhesive-free portion exists,
   applying said exposed laterally adhesive portion of the adhesive construction to an edge of said slit so that said central adhesive-free portion overlies said slit, said carrier having a central area free from adhesive, said remaining adhesive portion having a single release liner thereon extending into said adhesive-free area and forming a tab.

7. A process according to claim 6, including installing said article, and removing said release liner before applying said lateral adhesive portion, and applying said remaining lateral adhesive portion to the remaining edge of said slit of said article.

8. A process according to claim 7, including placing said adhesive-free central area over said slit.

9. A process according to claim 8, wherein said article is insulation and including applying said insulation to a conduit be for applying said remaining adhesive lateral portion.

10. A rolled adhesive having a construction consisting essentially of
    a single carrier layer, said carrier layer having longitudinal lateral adhesive portions thereon to leave a central area located between said longitudinal lateral portions, said central area being free from adhesive, and
    separate longitudinal release liners, each said separate release liner being located on one of said lateral adhesive portions, each said separate liner extending into and overlapping a portion of said central adhesive-free area.

* * * * *